United States Patent [19]

Murray

[11] 3,785,842
[45] Jan. 15, 1974

[54] SYNTHETIC AGGREGATES
[75] Inventor: Ransome James Murray, Gravesend, England
[73] Assignee: The Associated Portland Cement Manufacturers Limited, London, England
[22] Filed: Jan. 6, 1971
[21] Appl. No.: 104,757

[30] Foreign Application Priority Data
Jan. 16, 1970  Great Britain...................... 2303/70

[52] U.S. Cl................... 106/288 B, 106/60, 106/62
[51] Int. Cl............................................. C08h 17/04
[58] Field of Search ............ 106/60, 62, 67, DIG. 1, 106/288 B

[56] References Cited
UNITED STATES PATENTS

| | | | |
|---|---|---|---|
| 2,045,494 | 6/1936 | Riddle................................... | 106/62 |
| 2,224,498 | 12/1940 | Yoshiki................................ | 106/62 |
| 2,833,659 | 5/1958 | Bauer............................ | 106/DIG. 1 |
| 2,912,340 | 11/1959 | Pincus.................................. | 106/62 |
| 3,060,040 | 10/1962 | Bristow................................ | 106/62 |

*Primary Examiner*—James E. Poer
*Attorney*—Baldwin, Wight & Brown

[57] ABSTRACT

A method of producing a synthetic aggregate, comprising preparing a finely divided raw material having an oxide analysis $SiO_2$ 5–35 percent, $Al_2O_3$ 15–70 percent, FeO 0–65 percent. MgO 0–50 percent, alkalis <5 percent. and CaO<5 percent, the combined content of FeO and MgO being sufficient to provide at least 15 percent of spinels in the finished aggregate, agglomerating the raw material, and firing the agglomerated material at a temperature causing recrystallization of the raw materials until substantial elimination of any uncombined magnesium oxide is achieved and a material is produced comprising spinel crystals imbedded in a matrix of alumino-silicates, silicates, or a mixture thereof, and having a porosity low enough to provide an aggregate abrasion value less than 20 percent.

7 Claims, No Drawings

SYNTHETIC AGGREGATES

This invention relates to the production of synthetic aggregates for use as roadstones in the production of skid resistant surfaces.

Natural roadstones in many cases either provide insufficient skid resistance or become polished in use with consequent reduction in skid resistance below acceptable levels. As a result increasing attention is being paid to the use of synthetic aggregates for this purpose.

Good results have been obtained with material containing a large proportion of calcined bauxite, but unfortunately bauxite is an expensive material which in many countries must be imported.

The object of the present invention is to provide a synthetic aggregate for use as a high quality roadstone, utilizing raw materials which are readily available at a low price.

Natural and known synthetic aggregates for use as roadstone in general comprise particles of a hard abrasive material bonded into a softer matrix which wears faster than the hard material, the aggregate being produced by firing a mixture of the selected hard abrasive material of suitable particle size together with suitable matrix forming materials. As mentioned above, the most suitable hard abrasive material is calcined bauxite, which has the disadvantage of expense.

We have found that by firing suitable cheaply available raw materials or mixtures of raw material under suitable conditions of time and temperature, sintering and recrystallization takes place with the crystallization out of the fired material of spinels having a very high hardness, these spinels being imbedded in a softer matrix. Thus a single firing process both produce the desired hard abrasive material and imbeds it in a suitable matrix.

The general formula of spinels is $R''O.R'''_2O_3$ in which $R''$ includes Fe, Mg and Zn, $R'''$ includes Al, Cr and Mn. In terms of economy and physical properties in relation to the requirements of the present invention, the preferred spinels are $FeAl_2O_4$ and $MgAl_2O_4$.

According to the invention, a method of preparing a synthetic aggregate comprises preparing a finely divided raw material having an oxide analysis $SiO_2$ 5–35 percent, $Al_2O_3$ 15–70 percent, FeO 0–65 percent, MgO 0–50 percent, alkalis < 5 percent, and CaO < 5 percent, the combined content of FeO and MgO being sufficient to provide at least 15 percent of spinels in the finished aggregate, agglomerating the raw material, and firing the agglomerated material at a temperature causing recrystallization of the raw materials until substantial elimination of any uncombined magnesium oxide is achieved and a material is produced comprising spinel crystals imbedded in a matrix of alumino-silicates, silicates, or a mixture thereof, and having a porosity low enough to provide an aggregate abrasion value less than 20 percent.

Preferred raw materials have an alumina content in the range 15–40 percent, the FeO content in the range 5–40 percent, the MgO content in the range 5–40 percent, and the combined content of FeO and MgO is sufficient to produce at least 25 percent of spinels in the aggregate produced.

Where the raw material contains at least a proportion of its iron in ferric form, the firing step should be carried out under reducing conditions.

It is possible to replace at least part of the $Al_2O_3$ content with $Cr_2O_3$ and/or $Mn_2O_3$, but this will not normally be economic due to the high commercial value of chrome and manganese ores.

The invention extends to a synthetic aggregate having an oxide analysis $SiO_2$ 5–35%, $Al_2O_3$ 15–70 percent, FeO 0–65 percent, MgO 0–50 percent, alkalis < 5 percent, CaO < 5%, comprising at least 15 percent and preferably at least 25 percent of spinel crystals crystallized out of a matrix of silicates and/or alumino-silicates, and having an Aggregate Abrasion Value of less than 20 percent, and a Polished Stone Value of at least 60.

The raw material used may be a high iron clay of suitable analysis, or a mixture of the one hand of iron ore, ferruginous wastes, magnesite, magnesium oxide or hydroxide, carbonated magnesium hydroxide slurries, high iron clay or other material having a high FeO or MgO analysis, or a mixture thereof, with on the other hand, blast furnace slag, pulverised fuel ash, high alumina clay or other material having a high alumina analysis.

It will be understood that the waste, by-product and naturally occurring materials listed above for use as raw material are not pure oxides and therefore cannot yield pure spinels. However, such materials, in appropriate admixture having regard to the analysis of the materials and the phase diagram of principal oxides present, contain sufficient silica and alumina to enable spinel formation to take place at moderate temperatures and to provide a matrix material comprising silicates and alumino-silicates.

Either a wet or dry process can be employed to prepare the materials for firing, these materials being comminuted if necessary and blended in appropriate proportions.

The blended material may, prior to firing, be nodulized by conventional means, or mixed with a suitable binder, such as bentonite or another plastic clay, alginates, starch or tar oil residue, and extruded, to provide a size range in the fired material either suitable for direct use in road-making, or suitable for such use after moderate crushing, in which case any fines unsuitable for road-making use may be recycled to the nodulization stage. The fines may be fluxed with a material such as silica and fired to produce a satisfactory roadstone material.

Firing of the nodules or extruded material may be carried out using a suitable fuel in a rotary kiln, shaft kiln or on a sinter strand, at 1,000° to 1,500°C, the temperature employed and the length of the firing period employed being ascertained by experiment depending on the nature of the raw materials, the rate of spinel formation, and the necessity for substantially eliminating any uncombined magnesium oxide present, which might otherwise cause unsoundness in the finished product, and reducing the porosity of the product to a level giving it an aggregate abrasion value of less than 20 percent and preferably not more than 15 percent. The firing temperature must be sufficient to allow spinels to crystallize out of a matrix of silicates and/or alumino-silicates.

The invention is illustrated further by the following examples:

EXAMPLE 1.

A pulverised fuel ash having the analysis: $SiO_2$ 44.0 percent, $Al_2O_3$ 29.4 percent, $Fe_2O_3$ 9.16 percent, CaO 2.6 percent, MgO 2.0 percent Carbon 8.40 percent was blended and pugged with a ground natural magnesite containing 3 percent silica so that the proportion of fly ash to magnesium oxide was 2:1. The resulting pug was decarbonated at 800°C, taken to 1,380° in 45 min. and held at this temperature for 4 hours. It was cooled in 30 min. to 1,000°C and then tipped from the crucible furnace.

The phase composition of the material obtained was approximately; spinels ($MgAl_2O_4$ and $FeAl_2O_4$) 30 percent, forsterite $Mg_2SiO_4$ 52 percent, the remainder being a glassy material.

The material was produced in two batches which showed on test Aggregate Abrasion Values of 15 percent and Polished Stone Values of 67 and 66. Similar results were obtained when the time at maximum temperature was reduced to 20 minutes.

EXAMPLE 2.

The pulverised fuel ash employed in Example 1 was blended and pugged with a precipitated magnesium hydroxide so that the proportion of fly ash to MgO was again 2:1. A heating regime similar to that in Example 1 was employed except that the maximum temperature was 1,400° and the material was held at this temperature for 20 minutes.

Two batches were prepared which showed on test Aggregate Abrasion Values of 13 percent and Polished Stone Values of 64 and 63.

The test methods employed for determining the Polished Stone Values and Aggregate Abrasion Values were those specified in B.S.S. (British Standard Specification) 812, 1967.

What I claim is:

1. A method of producing a synethic aggregate useful as a road stone having a high-skid resistant surface, comprising preparing a finely divided raw material having the oxides $SiO_2$ 5–35 percent, $Al_2O_3$ 15–70 percent, FeO 0–65 percent, MgO 0–50 percent, alkalis < 5 percent, and CaO < 5 percent, the combined content of FeO and MgO being sufficient to provide at least 15 percent of spinels in the finished aggregate, agglomerating the raw material, and performing a single firing of the agglomerated material at a temperature and for a time sufficient to cause recrystallization of the raw materials until substantial elimination of any uncombined magnesium oxide is achieved and a material is produced comprising spinel crystals imbedded in a matrix of a member of the group consisting of silicates, and mixtures thereof, and having a porosity low enough to provide an aggregate abrasion value less than 20 percent.

2. A method according to claim 1 wherein the $Al_2O_3$ is in the range 15–40 percent, the FeO content in the range 5–40 percent, the MgO content in the range 5–40 percent, and the combined content of FeO and MgO is sufficient to produce at least 25 percent of spinels in the aggregate produced.

3. A method according to claim 2, in which at least a proportion of the iron content of the raw material is in ferric form, and the firing step is carried out under reducing conditions.

4. A method according to claim 2, wherein the raw material is a high iron clay.

5. The method of claim 2 wherein the single firing is performed at a first and second temperature.

6. An improved road stone synthetic aggregate having a highskid resistant surface while being economical to produce having a content as follows: $SiO_2$ - 5–35 percent, $Al_2O_3$ - 15–70 percent, FeO - 0–65 percent, MgO - 0–50 percent, alkalis < 5 percent, CaO < 5 percent; at least 15 percent of said content being in spinel crystal form, said spinel being in a matrix of silicates and said aggregate having an aggregate abrasion value of less than 20 percent, and a polished stone value of at least 60.

7. The road stone synthetic aggregate of claim 6 wherein at least 25 percent of said content is in spinel form.

* * * * *